(12) United States Patent
Pratizzoli

(10) Patent No.: US 6,298,596 B1
(45) Date of Patent: Oct. 9, 2001

(54) SYSTEM FOR THE CONTROLLED DIFFUSION OF ACTIVE SUBSTANCES IN CULTIVATION AND IN DEFENCE AGAINST PARASITES IN AGRICULTURE

(75) Inventor: William Pratizzoli, Medolla (IT)

(73) Assignee: Sagro S.p.A., Milan (IT)

( * ) Notice: Subject to any disclaimer, the term of this patent is extended or adjusted under 35 U.S.C. 154(b) by 0 days.

(21) Appl. No.: 09/364,066

(22) Filed: Jul. 30, 1999

Related U.S. Application Data

(63) Continuation-in-part of application No. 09/297,084, filed on Jul. 15, 1999.

(51) Int. Cl.[7] .................................................. A01M 1/16
(52) U.S. Cl. .......................................... 43/129; 47/1.01 R
(58) Field of Search .............................. 43/124, 126, 129, 43/131; 47/1.01 R, 58.1

(56) References Cited

U.S. PATENT DOCUMENTS

| | | | |
|---|---|---|---|
| 1,005,180 | * 10/1911 | Ellis | 43/131 |
| 3,146,546 | * 9/1964 | Moore | 43/131 |
| 4,160,335 | * 7/1979 | Von Kohorn et al. | 43/131 |
| 4,797,301 | * 1/1989 | Ardley et al. . | |

OTHER PUBLICATIONS

Examiner's Document A, 1990, internet.*
Examiner's Document B, 1990, intenet.*

* cited by examiner

Primary Examiner—Peter M. Poon
Assistant Examiner—Jeffrey L. Gellner
(74) Attorney, Agent, or Firm—Oblon, Spivak, McClelland, Maier & Neustadt, P.C.

(57) ABSTRACT

A plant, which affords moment-by-moment control of quantities of individual substances to be simultaneously diffused into the environment to provide, for example, control of insect pests. Unused active substances are preserved away from light and air.

20 Claims, 2 Drawing Sheets

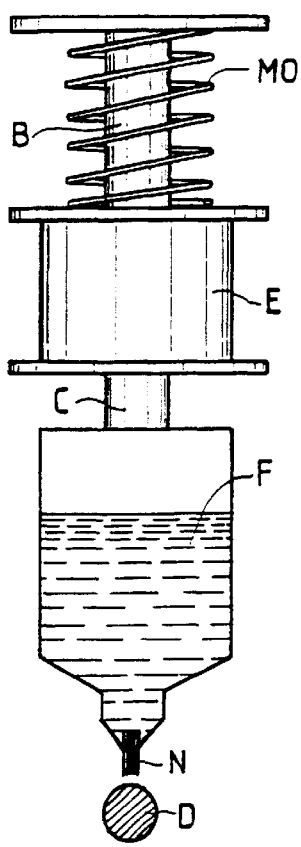
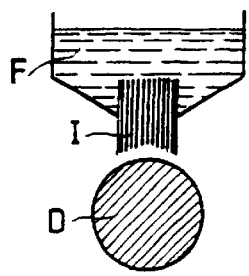
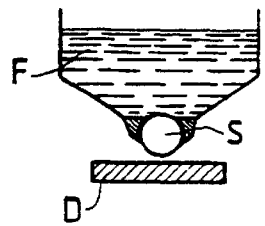
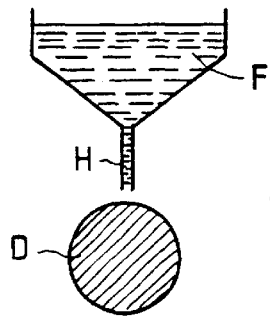
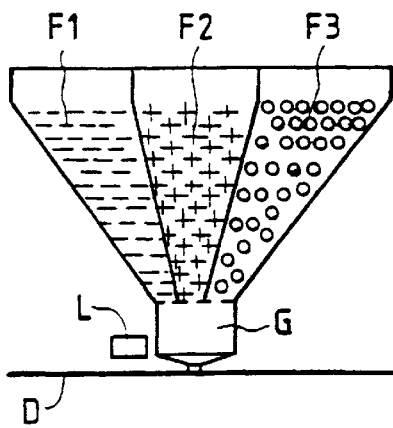
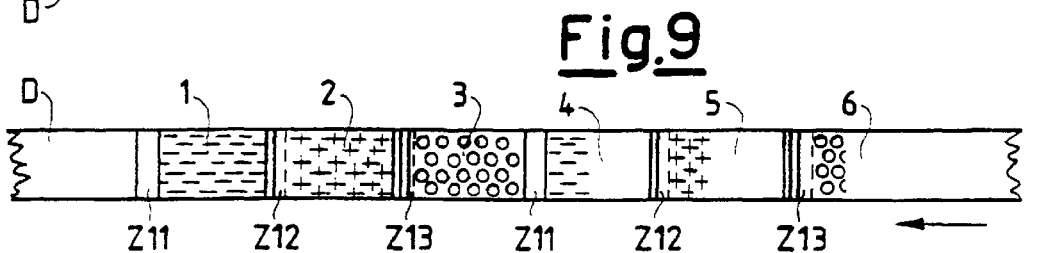

SYSTEM FOR THE CONTROLLED DIFFUSION OF ACTIVE SUBSTANCES IN CULTIVATION AND IN DEFENCE AGAINST PARASITES IN AGRICULTURE

This application is a continuation-in-part (CIP) application of PCT application Ser. No. 09/297,084, filed in the U.S. on Jul. 15, 1999, with an international filing date of Nov. 14, 1997.

BACKGROUND OF THE INVENTION

1. Field of the Invention

The present invention relates to a plant for the controlled diffusion of vaporizable active substances in agriculture and in defense against parasites, in particular, in applying the technique of sexual confusion and disorientation.

2. Description of the Background

Systems currently used for the diffusion of active substances which act in the vapor state are of two types. A first type of system projects active substances a mixed with water, either solubilized or microencapsulated, towards vegetation. A second type of system, which is used mainly with pheromones in the technique of sexual disorientation and confusion, exploits the capacity of certain materials to be partially permeable or to absorb the substances and release them with time. This is the principle on which dispensers operate in sexual confusion and disorientation.

The first system results in product losses by distribution and degradation, whereas the second system allows operation with low doses of active substance, but requires manual repositioning of the diffusers at least annually, any increase in the number of diffusion points and in the number of insects simultaneously controllable being achieved only by positioning new and different diffusers at a cost proportional to the number of diffusers applied. This system is also characterized by a certain rigidity in that the quantity of diffused active substance is not readily controllable on the basis of defence requirements, but is influenced by environmental parameters which cannot be modified, the active substance diffused being modifiable only by applying further dispensers.

SUMMARY OF THE INVENTION

Accordingly, it is an object of the present invention to provide a plant which allows moment-by-moment control of quantities of individual active compounds to be simultaneously diffused into the environment, with considerable advantages in terms of active substance economy. This diffusion is effected only when required, in a reliable and efficacious manner, and in a manner which is responsive to environmental situations requiring immediate variations in the quantity of active substance diffused and increases in the diffusion points without additional cost. It is also an object of the present invention, in the struggle against insects using sexual confusion and disorientation techniques, to simultaneously control several insects without cost increase due to additional diffusers, but considering only the active substance cost.

The above objects and others are provided by a plant for controlled diffusion of vaporizable active substances in cultivation and in defence against parasites in agriculture, characterised by consisting of a diffuser in the form of ribbon or filament of considerable length, joined at its ends to create an endless closed-circuit line positioned within the environment the subject of the diffusion along a predetermined path, said diffuser being slidable along the path and movable by traction mechanisms, and being charged with the active substances directly in the field by a charging apparatus positioned along the path of the diffuser and consisting of distributers able to transfer small quantities of the active substance to be vaporized onto small portions of defined segments of the movable ribbon or filament used as the diffuser, said segments being dedicated exclusively to the diffusion of a single substance and being locatable on the ribbon or filament by suitable sensors of optical or other signs printed on the on the ribbon or filament in other segments dedicated to this purpose, the movement of the diffuser relative to the distributer within the dedicated segment of the ribbon or filament being measurable by a similar method, the quantity of active substance deposited on the diffuser being adjustable roughly and occasionally by varying the mechanical structure of the distributer, and adjustable finely and continuously by regulating the time involved in distributing the active compound on the diffuser and the speed of advancement of the diffuser, there being controlled both the movement of the diffuser ribbon or filament, and the time of operation of the individual distributers in distributing active substance onto the diffuser, by a microprocessor on the basis of predefined time programs having as variables environmental parameters measured by suitable sensors connected to the microprocessor.

BRIEF DESCRIPTION OF THE DRAWINGS

FIG. 4 illustrates a distributor element for active substance in the liquid state, which illustration is enlarged compared to FIG. 2;

FIG. 5 illustrates a structure for the end part of the distributor element which lies in proximity to the diffuser ribbon or filament to be changed;

FIG. 6 illustrates another structure for the end part of the distributor element which lies in proximity to the diffuser ribbon or filament to be changed;

FIG. 7 illustrates yet another structure for the end part of the distributor element which lies in proximity to the diffuser ribbon or filament to be changed;

FIG. 8 illustrates another structure for the changing apparatus with jet operation for distributing three different active substances; and FIG. 9 illustrates an arrangement on the diffuser of those segments dedicated to location and two possible quantitative levels of active compound charge on the segments dedicated to diffusion.

DETAILED DESCRIPTION OF THE PREFERRED EMBODIMENTS

The present invention affords many advantages such as practicality of use, complete automation of all operations, as well as the possibility of maintaining any unused active substance under ideal conditions for preserving the specific characteristics thereof, away from light and air.

These and further advantages are all attained by a plant which exhibits controlled diffusion of vaporizable active substances, containing a diffuser in the form of ribbon or filament of considerable length, joined at the end thereof to create an endless closed-circuit line positioned within the environment the subject of the diffusion along a predetermined path, the diffuser being slidable along the path and movable by traction mechanisms, and being charged with the active substances directly in the field by a charging apparatus positioned along the path of the diffuser and containing distributors able to transfer small quantities of the active substance to be vaporized onto small portions of defined segments of the movable ribbon or filament used as the diffuser, the segments being dedicated to the diffusion of a single substance and being locatable on the ribbon or filament by suitable sensors for optical or other signs printed on the ribbon or filament in other segments dedicated to this purpose, the movement of the diffuser relative to the distributor within the dedicated segment of the ribbon or filament being measurable by a similar method. The quantity of active substance deposited on the diffuser being then adjustable roughly and occasionally by varying the structure of the distributor, and adjustable finely and continuously by regulating the time involved in distributing the active compound on the diffuser and the speed of advancement of the diffuser, there being controlled both the movement of the diffuser ribbon or filament, and the time of operation of the individual distributors in distributing active substance onto the diffuser, by a microprocessor on the basis of predefined time programs having as variables environmental parameters measured by suitable sensors connected to the microprocessor.

Further characteristics and advantages will be more apparent from the description of a preferred but not exclusive embodiment of a plant for the controlled diffusion of active substances in defence against insects using the technique of sexual disorientation or confusion.

Figure 1:
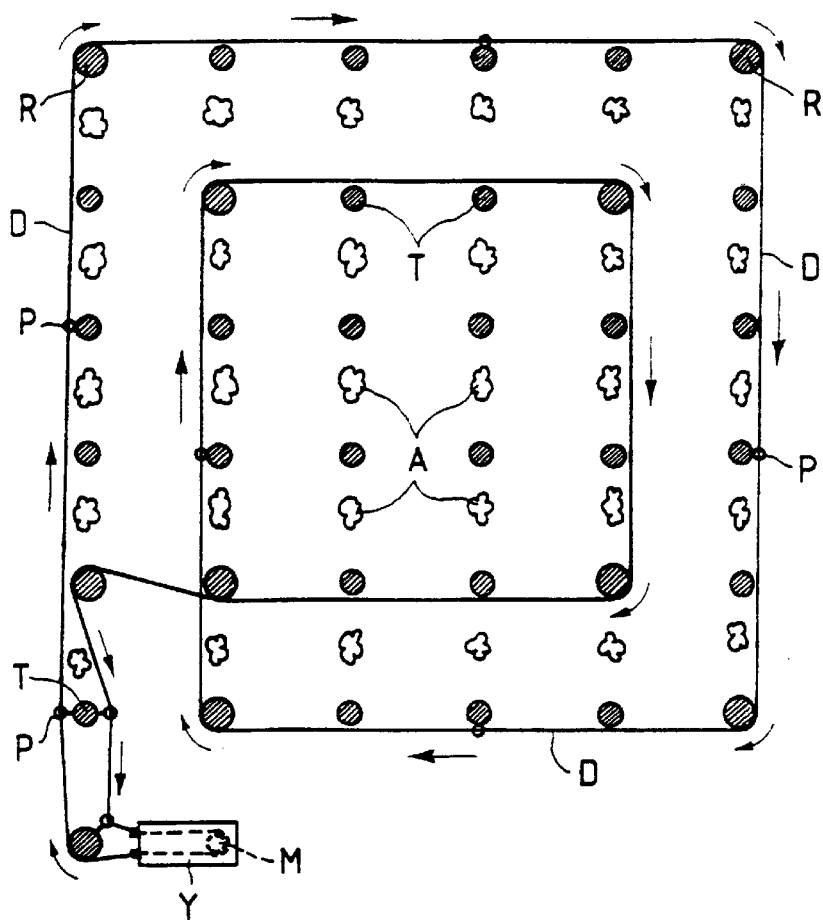
FIG. 1 illustrates a schematic plan view showing a path of the diffuser ribbon or filament in cultivation of an apple tree.
Figure 2:
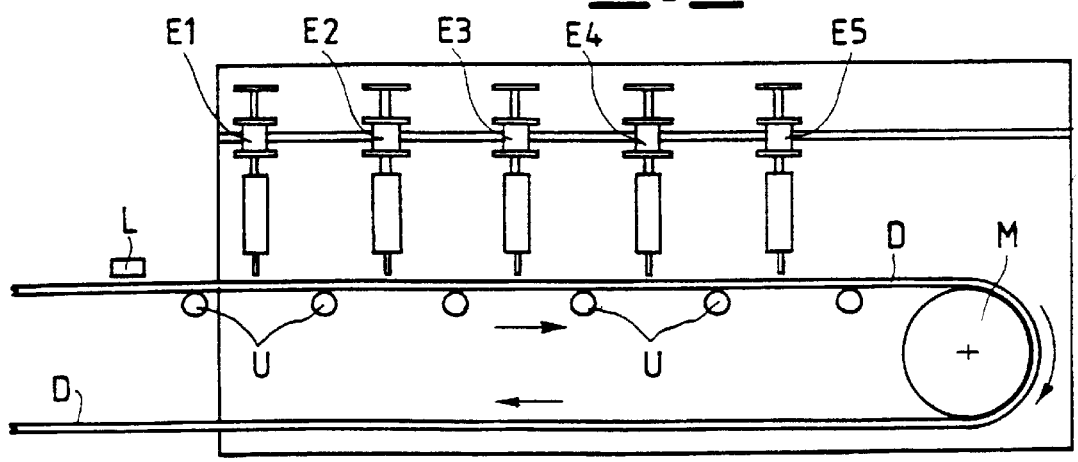
FIG. 2 illustrates a schematic view of a structure for the apparatus for changing the diffuser ribbon or filament with active substances.
Figure 3:
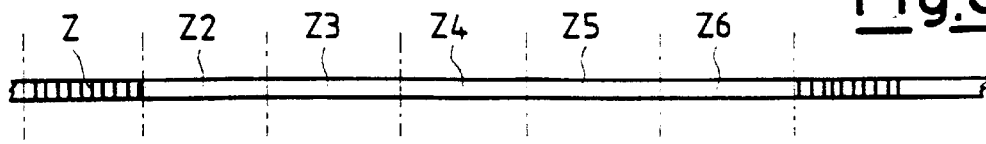
FIG. 3 illustrates a portion of diffuser ribbon or filament with a possible system for locating, by color boards, the segments dedicated to diffusion.

FIG. 1 is a schematic plan view showing a possible path of the diffuser ribbon or filament in apple tree cultivation; FIG. 2 is a schematic view of a possible structure for the apparatus for charging the diffuser ribbon or filament with active substances; FIG. 3 illustrates a portion of diffuser ribbon or filament with a possible system for locating, by colour bands, the segments dedicated to diffusion; this arrangement is suitable for the charging apparatus shown in FIG. 2.

FIG. 4 illustrates, enlarged compared with FIG. 2, a distributor element for active substances in the liquid state, in this case pheromone, of the charging apparatus of FIG. 2; FIGS. 5, 6 and 7 illustrate three possible structures for the end part of the distributor element which lies in proximity to the diffuser ribbon or filament to be charged, this latter being shown as a ribbon or filament in section; FIG. 8 illustrates a further possible structure of the charging apparatus with jet operation for distributing three different active substances; FIG. 9 illustrates on the diffuser a possible arrangement of those segments dedicated to location and two possible quantitative levels of active compound charge on the segments dedicated to diffusion; this arrangement is suitable for the charging apparatus of FIG. 8.

With reference to FIG. 1, D indicates the diffuser consisting of an endless ribbon or filament, the diffuser being supported and guided along the path defined by rollers R and eyelets P mounted on the poles T supporting the plants indicated by A. Along the path, in a position comfortable for normal maintenance, there is situated the active substance charging apparatus Y inside which, in this case, there is also provided the drive pulley M for driving the ribbon or filament along the path. The arrows indicate the direction of movement of the diffuser along the oath. It is noted that along the diffuser path, which is particularly suitable for applying the sexual confusion or disorientation technique, the most recently charged and hence most active segments of the diffuser are positioned on the outside, and only subsequently are they brought to the inside, a region in which a lesser concentration of active substance is acceptable.

In FIG. 2. E1, E2, E3, E4 and E5 indicate five distributors for five different active substances and controlled by microprocessors, D indicates the diffuser ribbon or filament supported by rollers U and driven by the drive pulley M controlled by microprocessors. L indicates an optical reader able to sense color variations printed on the diffuser (black bars) and to continuously feed the processor with information on the position of the diffuser ribbon or filament. FIG. 3 illustrates a possible dedicated segment distribution along a diffuser portion; Z, showing 10 black bars, indicates the segment dedicated to providing information on the position of the next segments; the 10 bars correspond to 10 positions on each of the next five segments. Z2, Z3, Z4, Z5 and Z6, which are each dedicated to receiving, transporting and diffusing the corresponding different active substance.

In FIG. 4, MO indicates a spring, E indicates an electrical winding within which the iron core B visible through the spring turns is free to move, and C indicates a connection of non-ferrous material between the core and the reservoir for the active substance F. The reservoir contains the active substance F which is able to reach the diffuser ribbon D, shown in section, only by the distributor terminal part N making contact with the diffuser ribbon or filament.

In the successive FIGS. 5, 6 and 7, F indicates the active substance, I indicates a capillary transport element for liquids, S indicates a ball and H indicates a tube of capillary dimensions, while D again indicates the diffuser shown in section.

In FIG. 8, F1, F2 and F3 indicate three different active compounds, also highlighted by different symbols, contained in the reservoirs of the jet charging apparatus, and G indicates the jet distributor which deposits the active substances on the diffuser D, L is an optical reader.

In FIG. 9, Z11, Z12 and Z13 indicate the segments dedicated to identifying the next segment 1, 2 and 3 and 4, 5 and 6 respectively, these being dedicated exclusively and respectively to diffusion of the active compounds F1, F2 and F3. The symbols which differentiate the various liquids in the distributor reservoir shown in FIG. 8 and represented on the six dedicated segments of the diffuser in FIG. 9. represent two possible quantitative charging levels of the three substances onto the diffuser.

With regard to plant operation, the drive pulley M transmits motion to the diffuser, and the distributors deposit defined quantities of active substance on the diffuser in relation to their operating time and the speed of travel of the diffuser ribbon or filament. The movement of the diffuser distributes the segments charged with the active substances along the defined path and hence into the environment concerned in the diffusion. Said segments diffuse the vaporizable active compound. Depending on requirements and the rate of vaporization o, the active substance, the diffuser can either move continuously and the dedicated segments be continuously charged, or be programmed to effect a complete periodic revolution (for example daily), and hence in the period considered each dedicated segment will be charged only once.

The quantity of compound (pheromone) distributed on the surface can hence be readily varied on the basis of the dedicated segment length charged and of the charging frequency.

As interference between the different compounds is possible, the diffuser has been divided into segments dedicated to diffusion, i.e. segments proposed for transporting and diffusing a single active compound during the progress of the diffuser revolutions through the path, and segments dedicated to identifying and recognizing the aforesaid diffuser segments and sensing the movements of the diffuser relative to the active substance distributors. In practice the reader, indicated in the figures by L and which can be optical or magnetic, reads the message on the diffuser ribbon or filament and feeds the data to the processor, which on the basis of the information received locates the segment dedicated to the diffusion of a certain substance and causes the distributor to charge it with the said substance, in the case of FIG. 4 by bringing the distributor into contact with the ribbon by the electromagnet E. The dedicated segment length covered by the substance, which in the final analysis defines the quantity of substance diffused, is determined by the processor program and by environmental variables, and is controlled by the optical or magnetic reader or by electronic angular sensors Positioned on drive or driven pulleys inserted into the path of the diffuser.

In practice, the materials used and the dimensions and the form of the paths and ribbons or filaments used as diffusers, the arrangement of the diffusers and their number, and the number of active substances diffused can be chosen at will according to requirements.

The present invention will now be further described by reference to certain Examples which are provided solely for purposes of illustration and are not intended to be limitative.

EXAMPLE 1

Controlling the Population of *Cydia molesta* and *Anarsia Lineatella* on Peach Trees A field of peach trees (Red Haven and Nectaross) of 8,000 sq. m surface was monitored by pheromone traps for *Cydia molesta* and *Anarsia lineatella*. At the first capture of *Cydia molesta* males (in the first decade of April) a controlled diffusion plant was installed and started up, composed of 1,200 meters of the line laid in a closed loop, above the tree crowns and parallel to the rows. In addition to the borders, the path also covered alternate rows of the lot.

The passing time of the line (silicon-coated dacron) along the loop was of 3 hours (400 m/hour). The daily activation of the plant was automatically programmed, by anticipating it about 3 hours before sunset.

The starting pulley, adjusted so as to distribute a dosage of 0.8 cc/day of a 50% pheromone solution, was equipped with 6 distributing elements over a circumference of 90 cm. (1 starting point for every 15 cm length of the line).

At the first capture of the males of *Anarsia lineatella* (mid-May) the system was modified to achieve the simultaneous diffusion of both types of pheromones (*Cydia m.* and *Anarsia l.*), by substituting half of the distributing elements of the *Cydia molesta* pheromone with an equal number of elements of the *Anarsia l.* pheromone.

The operation of the plant was modified by doubling the period of activity, so as to cover both the sunset period (3 hours) and the sunrise period (3 hours).

From the time of installing the system up to the time of harvesting the peaches, the capturing of the two phytophages was monitored in the traps installed within the test lot (peach tree field A) and in a neighboring peach tree field of similar characteristics, treated with specific insecticides (peach tree field B).

The results of the measurements are reported in Table 2.

At the time of harvesting the percentage of damage due to *Cydia molesta* and *Anarsia Lineatella* in lot A was compared with that on lot B. The results are reported in Table 3.

TABLE 1 insecticide treatments for *Cydia molesta* and *Anarsia lineatella* in lot B

| Date | Product |
| --- | --- |
| May 19 | Phosalone |
| June 04 | Azinphos-m |
| June 23 | Azinphos-m |
| July 15 | Etophenprox |

TABLE 2

Capture of the males of *Cydia molesta* and *Anarsia lineatella*

| Date | Cydia app. A | Cydia app. B | Anarsia app. A | Anarsia app. B |
| --- | --- | --- | --- | --- |
| April 07 | 4 | 0 | 0 | 0 |
| April 11 | 0 | 0 | 0 | 0 |
| April 18 | 0 | 0 | 0 | 0 |
| April 25 | 0 | 2 | 0 | 0 |
| May 02 | 0 | 1 | 0 | 0 |
| May 09 | 0 | 2 | 2 | 3 |
| May 16 | 0 | 4 | 8 | 7 |
| May 23 | 0 | 2 | 0 | 7 |
| May 30 | 0 | 2 | 0 | 8 |
| June 06 | 0 | 5 | 0 | 12 |
| June 13 | 0 | 3 | 0 | 9 |
| June 20 | 0 | 3 | 0 | 0 |
| June 27 | 0 | 6 | 0 | 8 |
| July 04 | 0 | 7 | 0 | 11 |
| July 11 | 0 | 11 | 0 | 14 |
| July 18 | 0 | 15 | 0 | 34 |
| July 25 | 0 | 11 | 0 | 45 |
| Aug. 01 | 0 | 10 | 0 | 17 |

TABLE 3

% Damage to the harvest due to *Cydia molesta* and *Anarsia lineatella*

| Harvesting date | Cultivar | % Damage app. A | % Damage app. B |
| --- | --- | --- | --- |
| July 06 | Red Haven | 2.50 | 3.10 |
| July 09 | Red Haven | 0.75 | 1.20 |
| July 16 | Red Haven | 0.50 | 0.90 |
| July 30 | Nectaross | 2.3 | 2.5 |
| August 06 | Nectaross | 6.5 | 7.1 |

EXAMPLE 2

Control of the Population of *Cydia molesta* and *Anarsia lineatella* on Peach Trees A field of peach trees (Morsiani 51) of 7,000 sq. m surface was monitored by pheromone traps for *Cydia molesta* and *Anarsia lineatella*. At the first capture of *Cydia molesta* males (end of April) a controlled diffusion plant was installed and started up, composed of 1,000 meters of line laid in a closed loop, above the tree crowns and parallel to the rows. In addition to the borders, the path also covered alternate rows of the lot.

The passing time of the line (silicon-coated dacron) along the loop was of 2.5 hours (400 m/hour). The daily activation of the plant was automatically programmed, by anticipating it about 3 hours before sunset.

The starting pulley, adjusted so as to distribute a dosage of 0.7 cc/day of a 50% pheromone solution, was equipped with 6 distributing elements over a circumference of 90 cm. (1 starting point for every 15 cm length of the line).

At the first capture of the males of *Anarsia lineatella* (mid-May) the system was modified to achieve the simultaneous diffusion of both types of pheromones (*Cydia m.* and Anarsia l.), by substituting half of the distributing elements of the Cydia molesta pheromone with an equal number of elements of the Anarsia l. pheromone.

The operation of the plant was modified by doubling the period of activity, so as to cover both the sunset period (3 hours) and the sunrise period (3 hours).

From the time of installing the system up to the time of harvesting the peaches, the capturing of the two phytophages was monitored at regular 7-day intervals in the traps installed within the test lot (peach tree field A) and in a neighboring peach tree field of similar characteristics, treated with specific insecticides (peach tree field B). The insecticide treatments applied in peach tree field B are reported in Table 4.

The results of the measurements are reported in Table 5.

At the time of harvesting the percentage of damage due to Cydia molesta and Anarsia Lineatella in lot A was compared with that on lot B. The results are reported in Table 6.

TABLE 4

Insecticide treatments for Cydia molesta and Anarsia lineatella in lot B

| Date | Product |
| --- | --- |
| May 30 | Phosalone |
| June 15 | Azinphos-m |
| July 02 | Azinphos-m |
| July 15 | Azinphos-m |
| July 30 | Carbaryl |

TABLE 5

Capture of the males of Cydia molesta and Anarsia lineatella

| Date | Cydia app. A | Cydia app. B | Anarsia app. A | Anarsia app. B |
| --- | --- | --- | --- | --- |
| April 18 | 0 | 0 | 0 | 0 |
| April 25 | 2 | 2 | 0 | 0 |
| May 02 | 0 | 1 | 0 | 0 |
| May 09 | 0 | 2 | 3 | 3 |
| May 16 | 0 | 3 | 4 | 4 |
| May 23 | 0 | 1 | 0 | 7 |
| May 30 | 0 | 0 | 0 | 16 |
| June 06 | 0 | 3 | 0 | 6 |
| June 13 | 0 | 4 | 0 | 2 |
| June 20 | 0 | 3 | 0 | 14 |
| June 27 | 0 | 2 | 0 | 5 |
| July 04 | 0 | 6 | 0 | 10 |
| July 11 | 0 | 7 | 0 | 15 |
| July 18 | 0 | 7 | 0 | 24 |
| July 25 | 0 | 9 | 0 | 25 |
| Aug. 01 | 0 | 5 | 0 | 3 |
| Aug. 08 | 0 | 18 | 0 | 5 |
| Aug. 14 | 0 | 15 | 0 | 12 |

TABLE 6

% Damage to the harvest due to Cydia molesta and Anarsia lineatella

| Harvesting date | Cultivar | % Damage app. A | % Damage app. B |
| --- | --- | --- | --- |
| Aug. 16 | Morsiani 51 | 4.50 | 3.90 |
| Aug. 19 | Morsiani 51 | 1.20 | 1.20 |
| Aug. 25 | Morsiani 51 | 0.90 | 0.50 |

EXAMPLE 3
Control of the Population of Cydia pomonella on Pear Trees

A field of pear trees (Guyot) of 10,000 sq. m surface was monitored by pheromone traps for Cydia pomonella. At the first capture of Cydia molesta males (mid April) a controlled diffusion plant was installed and started up, composed of 1.500 meters of line laid in a closed loop, above the tree crowns and parallel to the rows. In addition to the borders, the path also covered alternate rows of the lot.

The passing time of the line (0.6 mm nylon) along the loop was of 3 hours (500 m/hour).

The daily activation of the plant was automatically programmed, by anticipating it about 3 hours before sunset.

The starting pulley, adjusted so as to distribute a dosage of 0.5 cc/day of a 25% pheromone solution, was equipped with 12 distributing elements over a circumference of 90 cm. (1 starting point for every 7.5 cm length of the line).

From the time of installing the system up to the time of harvesting the pears. The capturing of the phytophage was monitored at regular 7-day intervals in the traps installed within the test lot (pear tree field A) and in a neighboring pear tree field of similar characteristics, treated with specific insecticides (pear tree field B). The insecticide treatments applied in pear tree field B are reported in Table 7.

The results of the measurements are reported in Table 8.

At the time of harvesting the percentage of damage due to Cydia pomonella in lot A was compared with that on lot B. The results are reported in Table 9.

TABLE 7

Insecticide treatments for Cydia pomonella in lot B

| Date | Product |
| --- | --- |
| May 05 | Tebuphenazide |
| May 15 | Azinphos-m |
| June 22 | Tebuphenazide |
| July 07 | Azinphos -m |
| July 21 | Etophenprox |

TABLE 8

Capture of Cydia Pomonella males

| Date | Cydia appl. A | Cydia app. B |
| --- | --- | --- |
| April 20 | 0 | 1 |
| April 27 | 0 | 1 |
| May 02 | 0 | 2 |
| May 09 | 0 | 0 |
| May 16 | 0 | 1 |
| May 30 | 0 | 1 |
| May 23 | 0 | 0 |
| June 06 | 0 | 2 |
| June 13 | 0 | 0 |
| June 20 | 0 | 0 |
| June 27 | 0 | 0 |
| July 04 | 0 | 0 |
| July 11 | 0 | 0 |
| July 18 | 0 | 1 |

TABLE 9

% Damage to the harvest due to Cydia pomonella

| Harvesting date | Cultivar | % Damage app. A | % Damage app. B |
| --- | --- | --- | --- |
| July 28 | Dr. Guyot | 0.20 | 0.10 |

EXAMPLE 4
Controlling of the Population of Cydia pomonella on Pear Trees

A pear tree field of (William and Abate) of 8,000 sq. m surface was monitored by pheromone traps for Cydia pomonella.

At the first capture of *Cydia pomonella* males (mid April) a controlled diffusion plant was installed and started up, composed of 1,200 meters of line laid in a closed loop, above the tree crowns and parallel to the rows. In addition to the borders, the path also covered alternate rows of the lot.

The passing time of the line (0.6 mm diameter nylon) along the loop was of 3 hours (400 m/hour).

The daily activation of the plant was automatically programmed, by anticipating it about 3 hours before sunset.

The starting pulley, adjusted so as to distribute a dosage of 0.4 cc/day of a 25% pheromone solution, was equipped with 12 distributing elements over a circumference of 90 cm. (1 starting point for every 7.5 cm length of the line).

From the time of installing the system up to the time of harvesting the pears, the capturing of the phytophages was monitored at regular 7-day intervals in the traps installed within the test lot (pear tree field A) and in a neighboring pear tree field of similar characteristics, treated with specific insecticides (pear tree field B). The insecticide treatments applied in pear tree field B are reported in Table 10.

The results of the measurements are reported in Table 11.

At the time of harvesting the percentage of damage due to *Cydia pomonella* in lot A was compared with that on lot B. The results are reported in Table 12.

TABLE 10

Insecticide treatments for *Cydia pomonella* in lot B

| Date | Product |
| --- | --- |
| May 05 | Fluphenoxeron |
| May 15 | Azinphos-m |
| June 22 | Fluphenoxeron |
| July 07 | Azinphos-m |
| July 24 | Azinphos-m |
| Aug. 05 | Etophenprox |

TABLE 11

Capture of *Cydia pomonella* males

| Date | Cydia appl. A | Cydia app. B |
| --- | --- | --- |
| April 20 | 0 | 0 |
| April 27 | 0 | 0 |
| May 02 | 0 | 0 |
| May 09 | 2 | 1 |
| May 16 | 0 | 1 |
| May 23 | 0 | 1 |
| May 30 | 0 | 0 |
| June 06 | 0 | 0 |
| June 13 | 0 | 1 |
| June 20 | 0 | 1 |
| June 27 | 0 | 0 |
| July 04 | 0 | 0 |
| July 11 | 0 | 0 |
| July 18 | 0 | 1 |
| July 25 | 1 | 1 |
| Aug. 01 | 2 | 2 |
| Aug. 08 | 0 | 0 |
| Aug. 16 | 0 | 0 |

TABLE 12

% Damage to the harvest due to *Cydia pomonella*

| Harvesting date | Cultivar | % Damage app. A | % Damage app. B |
| --- | --- | --- | --- |
| Aug. 10 | William | 0.50 | 0.30 |
| Sept. 07 | Abate | 1.20 | 1.50 |

Generally, the present invention may be advantageously used in agriculture, generally, without restriction for crops, such as corn soy or wheat, and for fruits and vegetables. For example, the present invention may be used to advantage in the cultivation of fruits, such as, apples, peaches, pears, grapes, citrus or tomatoes, and for vegetables, such as broccoli, lettuce or celery. However, the present invention is particularly useful when used in cultivation of fruit trees, such as apples and pears.

Having described the present invention, it will now be apparent and are skilled in the art that many changes and modifications may be made to the above-described embodiments without departing from the spirit and the scope of the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for controlled diffusion of vaporizable active substances in cultivation and in defense against parasites in agriculture, which comprises a diffuser in the form of ribbon or filament, joined at the ends thereof to create an endless closed-circuit line positioned within an environment of a subject of the diffusion along a predetermined path, said diffuser being slidable along the path and movable by traction mechanisms, and being charged with the active substances directly by a charging apparatus positioned along the path of the diffuser and comprising distributors able to transfer quantities of the active substances to be vaporized onto portions of defined segments of the movable ribbon or filament used as the diffuser, said segments effecting diffusion of a single substance and being locatable on the ribbon or filament by sensors for indicators printed on the ribbon or filament in other segments, the movement of the diffuser relative to the distributor within the segment of the ribbon or filament being similarly measurable, the quantity of active substance deposited on the diffuser being adjustable, grossly and discontinuously, by varying a mechanical structure of the distributor, and adjustable, finely and continuously, by regulating time involved in distributing the active compound on the diffuser and the speed of advancement of the diffuser, whereby both the movement of the diffuser ribbon or filament, and the time of operation of the individual distributors in distributing active substance onto the diffuser, by a microprocessor using predefined time programs having as variables environmental parameters measured by sensors connected to the microprocessor.

2. The system of claim 1, wherein the diffuser filament or ribbon is made of plastic.

3. The system of claim 1, wherein the diffuser is made of metal.

4. The system of claim 1, wherein the diffuser is made of plastic and metal.

5. The system of claim 1, wherein the individual segments for diffusion of the active substance are located by the optical reading of bar codes printed on the diffuser.

6. The system of claim 1, wherein the individual segments for the diffusion of the active substance are located by magnetic reading.

7. The system of claim 1, wherein diffusion of a single substance or diffusion of compatible substances to be diffused successively on the same diffuser segment is required, whereby it is unnecessary to identify the segments, and further whereby the signals and equipment related thereto are not required, the diffuser advancement being evaluated on the basis of the revolutions or part revolutions of the drive pulley or of a driven pulley.

8. The system of claim 1, wherein the active substance to be diffused is a phytopharmaceutical compound or composition useful against cryptogams.

9. The system of claim 1, wherein the active substance to be diffused is a phytopharmaceutical compound or composition useful against parasite insects.

10. The system of claim 1, wherein the active substance to be diffused is a plant development regulator.

11. The system of claim 1, wherein the active substance to be diffused is a decoy for pronuba insects.

12. The system of claim 1, wherein the substance to be diffused is solid, charging being effected by rubbing the solid against the moving diffuser.

13. The system of claim 1, wherein the diffuser is charged with a liquid active substance contained in the distributor reservoir by contact or rubbing of the tip of the distributor against the diffuser while at rest or while moving, said tip being manufactured from a bunch of fibers able to absorb and to transfer onto the diffuser the constituent liquid of the active substance.

14. The system of claim 1, wherein the diffuser is charged with a liquid active substance contained in the distributor reservoir by contact or sliding of the tip of the distributor against the diffuser while at rest or while moving, said tip being manufactured from a ball, of which the surface in contact with the liquid is able to be wetted with, and to transfer onto the diffuser, the constituent liquid of the active substance.

15. The system of claim 1, wherein the diffuser is charged with a liquid active substance contained in the distributor reservoir by a jet of small quantities of the constituent liquid of the active substance.

16. The system of claim 1, wherein the environmental parameters measured by the sensors connected to the microprocessor include the active substance concentration measured by an electronic sensor.

17. The system of claim 1, wherein the plant functions are controlled by radio contact with a control center not adjacent to the site for active substance diffusion.

18. The system of claim 1, wherein along its path the diffuser is supported and guided by rollers and eyelets, and it being maintained under tension by tensioners and driven by one or more drive pulleys.

19. The system of claim 1, wherein on the diffuser there are segments present dedicated to pheromones, insecticides, fungicides, acaricides, phytoregulators or repellent substances or a combination thereof.

20. The system of claim 1, wherein the environment, the subject of the diffusion, is used for product protection.

* * * * *

UNITED STATES PATENT AND TRADEMARK OFFICE
CERTIFICATE OF CORRECTION

PATENT NO.    : 6,298,596 B1
DATED         : October 9, 2001
INVENTOR(S)   : Pratizzoli It is certified that error appears in the above-identified patent and that said Letters Patent is hereby corrected as shown below:

<u>Title page, Item [54], and Column 1, lines 1-4,</u>
The title should be:
-- SYSTEM FOR THE CONTROLLED DIFFUSION OF ACTIVE SUBSTANCES IN CULTIVATION AND IN DEFENSE AGAINST PARASITES IN AGRICULTURE --
Item [30], the Foreign Application Priority information should read:

-- (30)       Foreign Application Priority Data
Nov. 15, 1996    (IT).................................MO96A000149 --

Item [63], the Related U.S. Application information should read:

-- Related U.S. Application Data
(63) Continuation-in-part of application No. 09/297,084, filed as application No. PCT/EP97/06439, filed on November 14, 1997 --.

Signed and Sealed this

Eighteenth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,298,596 B1
DATED : October 9, 2001
INVENTOR(S) : Pratizzoli

It is certified that error appears in the above-identified patent and that said Letters Patent is hereby corrected as shown below:

<u>Title page,</u>
Item [73], Assignee's information should read:

-- [73]   Assignee:   Isagro S.p.A., Milan (IT) --

Signed and Sealed this

Sixth Day of August, 2002

Attest:

JAMES E. ROGAN
*Attesting Officer*         *Director of the United States Patent and Trademark Office*